United States Patent
Yamashita et al.

(10) Patent No.: US 11,333,523 B2
(45) Date of Patent: May 17, 2022

(54) VEHICLE CONTROL DEVICE, OUTPUT DEVICE, AND INPUT AND OUTPUT DEVICE

(71) Applicant: TOYOTA JIDOSHA KABUSHIKI KAISHA, Toyota (JP)

(72) Inventors: Keiji Yamashita, Nisshin (JP); Koichi Ikemoto, Nagoya (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 16/668,679

(22) Filed: Oct. 30, 2019

(65) Prior Publication Data
US 2020/0149920 A1 May 14, 2020

(30) Foreign Application Priority Data
Nov. 12, 2018 (JP) .............................. JP2018-212206

(51) Int. Cl.
*G01C 21/36* (2006.01)
*G05D 1/00* (2006.01)
*G01C 21/34* (2006.01)

(52) U.S. Cl.
CPC ....... *G01C 21/3697* (2013.01); *G01C 21/343* (2013.01); *G05D 1/0088* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2016/0209842 A1* | 7/2016 | Thakur | G05D 1/0088 |
| 2018/0060991 A1 | 3/2018 | Yashiro | |
| 2019/0066516 A1* | 2/2019 | Kuhara | G08G 1/202 |
| 2019/0103028 A1 | 4/2019 | Kobayashi et al. | |
| 2019/0129438 A1 | 5/2019 | Morita et al. | |
| 2019/0250002 A1* | 8/2019 | Zhao | B60W 50/14 |
| 2019/0295413 A1* | 9/2019 | Hase | G06K 9/00369 |

FOREIGN PATENT DOCUMENTS

| | | |
|---|---|---|
| JP | 2010-281628 A | 12/2010 |
| JP | 2014-66576 A | 4/2014 |
| JP | 2017-182137 A | 10/2017 |
| JP | 2018-32137 A | 3/2018 |
| JP | 2019-079462 A | 5/2019 |

* cited by examiner

*Primary Examiner* — Tamara L Weber
(74) *Attorney, Agent, or Firm* — Sughrue Mion, PLLC

(57) ABSTRACT

A vehicle control device that controls a vehicle configured to transport a passenger to a destination by autonomous traveling, the vehicle control device includes a vehicle controller configured to control operation of the vehicle, an image display configured to display an image of a periphery of the destination to the passenger via an output device, and a getting-off position detector configured to detect a desired getting-off position designated by the passenger via an input device. The image shows a region where stopping is prohibited, and the vehicle controller is configured to cause the vehicle to stop at the desired getting-off position.

13 Claims, 10 Drawing Sheets

VEHICLE CONTROL DEVICE, OUTPUT DEVICE, AND INPUT AND OUTPUT DEVICE

INCORPORATION BY REFERENCE

The disclosure of Japanese Patent Application No. 2018-212206 filed on Nov. 12, 2018 including the specification, drawings and abstract is incorporated herein by reference in its entirety.

BACKGROUND

1. Technical Field

The disclosure relates to a vehicle control device, an output device, and an input and output device.

2. Description of Related Art

In the related art, a vehicle configured to transport a passenger to a destination by autonomous traveling is known. Japanese Unexamined Patent Application Publication No. 2017-182137 (JP 2017-182137 A) discloses a demand bus operating in response to a user's usage request. In such a demand bus, an operation plan is generated based on the user's usage request, and the passenger gets off at a getting-off position defined in the operation plan.

On the other hand, in a taxi with a driver of the related art, in usual, the passenger first tells the rough destination to the driver, and then designates a detailed getting-off position in the vicinity of the destination. At this time, since the driver is well-informed about traffic rules, the driver can select an appropriate getting-off position based on the instruction of the passenger.

SUMMARY

Although the driver is not present in an autonomously travelable vehicle such as the demand bus, as in the taxi of the related art, the designation of the detailed getting-off position is desirable to be made by the passenger in the vehicle in the vicinity of the destination. However, when all places in the vicinity of the destination can be designated as the getting-off position, the passenger has difficulty in the designation of an appropriate place as the getting-off position. For example, in a case where the passenger is not well-informed about the traffic condition in the vicinity of the destination, the passenger has difficulty in quick recognition of a place that the passenger can get off.

The disclosure facilitates designation of a getting-off position by a passenger in a case where an autonomously travelable vehicle transports the passenger.

The summary of the present disclosure is as follows.

(1) A first aspect of the disclosure relates to a vehicle control device that controls a vehicle configured to transport a passenger to a destination by autonomous traveling. The vehicle control device includes a vehicle controller, an image display, and a getting-off position detector. The vehicle controller is configured to control operation of the vehicle. The image display is configured to display an image of a periphery of the destination to the passenger via an output device. The getting-off position detector is configured to detect a desired getting-off position designated by the passenger via an input device. The image shows a region where stopping is prohibited. The vehicle controller is configured to cause the vehicle to stop at the desired getting-off position.

(2) The vehicle control device according to (1) may further include a periphery information detection device configured to detect periphery information of the vehicle. The image display may be configured to determine the region where stopping is prohibited, based on the periphery information detected by the periphery information detection device.

(3) In the vehicle control device according to (1) or (2), when the vehicle travels in the vicinity of the destination, the vehicle controller may cause the vehicle to move in a direction designated by the passenger via the input device, before the getting-off position detector detects the desired getting-off position.

(4) In the vehicle control device according to any one of (1) to (3), in a case where the getting-off position detector does not detect the desired getting-off position, the vehicle controller may cause the vehicle to stop at a position where a distance to the destination is equal to or less than a predetermined value and stopping is not prohibited.

(5) In the vehicle control device according to any one of (1) to (4), in a case where the desired getting-off position is within the region where stopping is prohibited, the vehicle controller may cause the vehicle to stop at a position where a distance to the desired getting-off position is equal to or less than a predetermined value and stopping is not prohibited.

(6) In the vehicle control device according to any one of (1) to (5), the image may show a current position of the vehicle.

(7) In the vehicle control device according to any one of (1) to (6), the image may show a candidate for the getting-off position.

(8) In the vehicle control device according to (7), the image may show a plurality of the candidates for the getting-off position and priorities of the candidates and the image display may be configured to raise the priority of the candidate for which evaluation based on predetermined evaluation criteria is relatively high, than the priority of the candidate for which the evaluation is relatively low.

(9) In the vehicle control device according to any one of (1) to (8), the image display may be configured to change a display mode of a region other than the region where stopping is prohibited, based on predetermined evaluation criteria.

(10) In the vehicle control device according to (9), the display mode may be brightness, transparency, a kind of colors, or an interval of hatching.

(11) In the vehicle control device according to any one of (8) to (10), the evaluation criteria may include a degree of safety of the passenger.

(12) In the vehicle control device according to any one of (8) to (11), the evaluation criteria may include a demand of the passenger.

(13) A second aspect of the disclosure relates to an output device that is provided in a vehicle configured to transport a passenger to a destination by autonomous traveling or is communicatable with the vehicle. The output device is configured to display an image of a periphery of the destination showing a region where stopping is prohibited, to the passenger.

(14) A third aspect of the disclosure relates to an input and output device that is provided in a vehicle configured to transport a passenger to a destination by autonomous traveling or is communicatable with the vehicle. The input and output device is configured to display an image of a periphery of the destination showing a region where stopping is prohibited, to the passenger and to allow the passenger to input a desired getting-off position.

According to the aspects of the present disclosure, the designation of the getting-off position by the passenger in a case where the autonomously travelable vehicle transports the passenger can be facilitated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
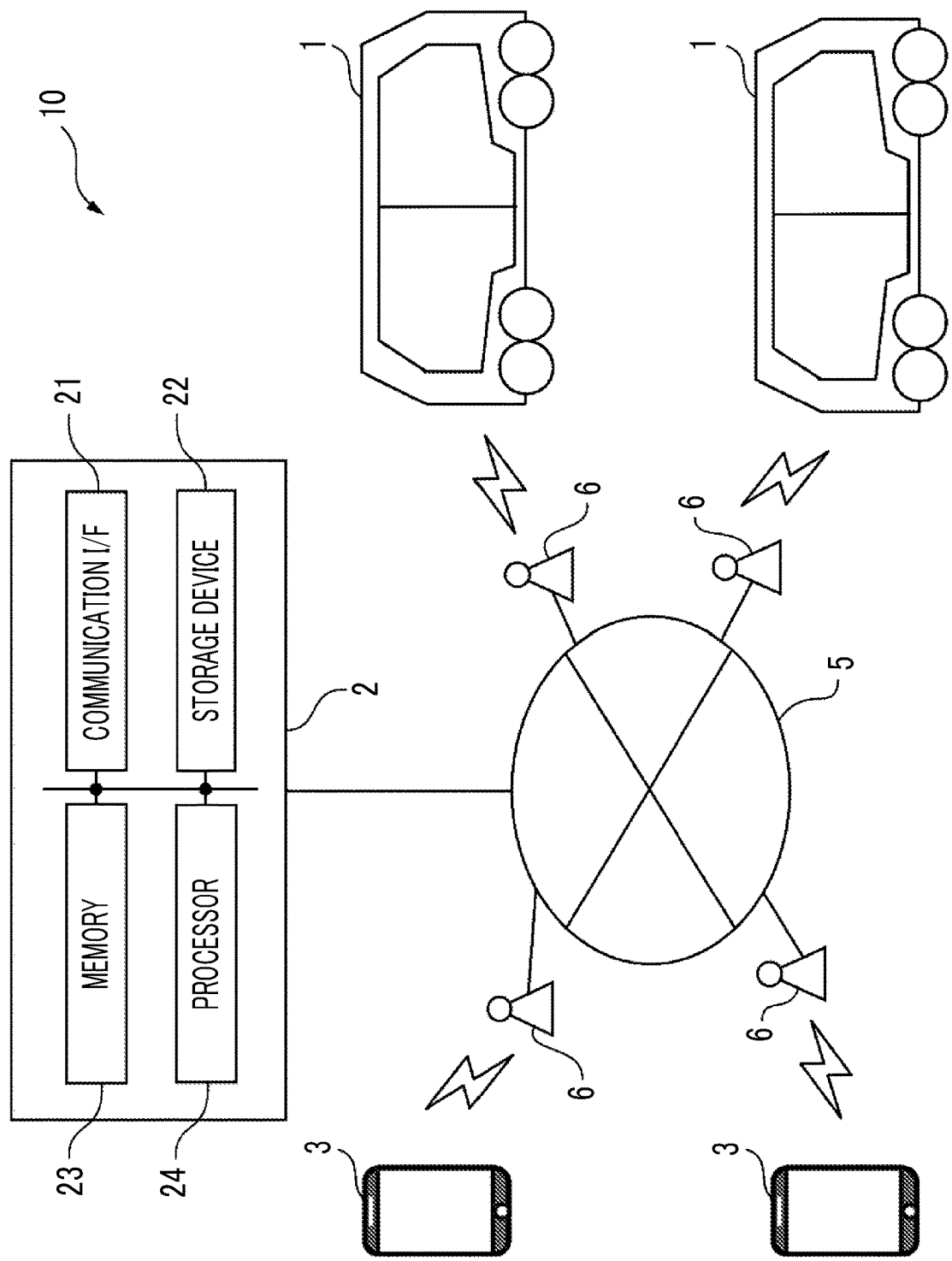
FIG. 1 is a schematic configuration diagram of a passenger transportation system according to a first embodiment of the present disclosure.

Hereinafter, embodiments of the present disclosure will be described with reference to the drawings. In the following description, the same configuration components are denoted by the same reference numerals.

First Embodiment

Hereinafter, a first embodiment of the present disclosure will be described with reference to FIGS. 1 to 8. FIG. 1 is a schematic configuration diagram of a passenger transportation system according to the first embodiment of the present disclosure. The passenger transportation system 10 provides mobility service such as car sharing service or ride-hailing service. Specifically, the passenger transportation system 10 transports the user to a desired destination by using an autonomously traveling vehicle 1 in response to a vehicle allocation request from a user. In the ride-hailing service, a plurality of users heading for destinations close to each other can use one vehicle 1 at the same time.

As shown in FIG. 1, the passenger transportation system 10 includes the vehicle 1, a server 2 and a portable terminal 3. The vehicle 1, the server 2 and the portable terminal 3 can communicate with each other.

The vehicle 1 is configured to transport the passenger to the destination by autonomous traveling. The vehicle 1 is an autonomous driving vehicle that autonomously travels, and does not need a driver for operating the vehicle 1. In the mobility service, a plurality of vehicles 1 is used so that a large number of users can use the service. The vehicle 1 is managed by a service provider who provides a mobility service.

Figure 2:
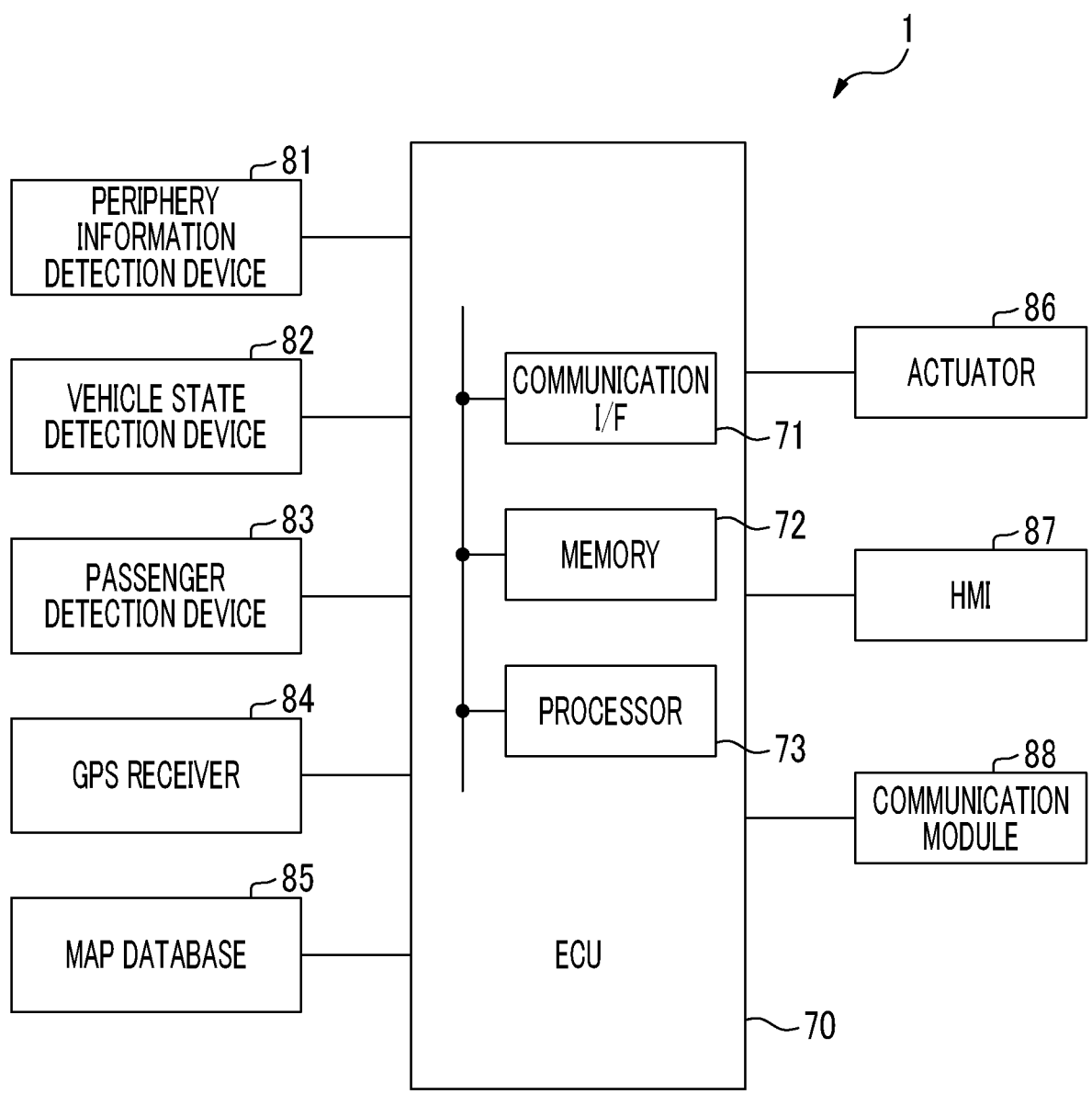
FIG. 2 is a schematic view showing a configuration of a vehicle.

FIG. 2 is a schematic view showing a configuration of a vehicle 1. The vehicle 1 includes an electronic control unit (ECU) 70. The ECU 70 includes a communication interface 71, a memory 72, and a processor 73, and executes various controls of the vehicle 1. The communication interface 71 and the memory 72 are connected to the processor 73 via a signal line. Although one ECU 70 is provided in the vehicle in the first embodiment, a plurality of ECUs may be provided in the vehicle for each function.

The communication interface 71 has an interface circuit for connecting the ECU 70 to an in-vehicle network conforming to a standard such as a controller area network (CAN). The ECU 70 communicates with other on-vehicle components via the communication interface 71.

The memory 72 includes, for example, a volatile semiconductor memory (for example, a RAM) and a nonvolatile semiconductor memory (for example, a ROM). The memory 72 stores programs executed by the processor 73 and various data used when the processor 73 executes various processes.

The processor 73 includes one or a plurality of central processing units (CPU) and peripheral circuits of the CPUs, and executes various processes. The processor 73 may further include an arithmetic circuit such as a logical operation unit or a numerical operation unit.

Also, the vehicle 1 includes a periphery information detection device 81. The periphery information detection device 81 detects periphery information of the vehicle 1 for autonomous traveling of the vehicle 1. The periphery information includes information such as white lines on a road, other vehicles, pedestrians, bicycles, buildings, road signs, traffic lights, and obstacles. The periphery information detection device 81 is connected to the ECU 70 via the in-vehicle network, and the output of the periphery information detection device 81 is transmitted to the ECU 70. The periphery information detection device 81 includes, for example, an external camera, a millimeter wave radar, a laser imaging detection and ranging (LIDAR), and an ultrasonic sensor. The external camera captures the outside of the vehicle 1 and generates a peripheral image.

Also, the vehicle 1 includes a vehicle state detection device 82. The vehicle state detection device 82 detects a state of the vehicle 1 for autonomous traveling of the vehicle 1. The vehicle state detection device 82 is connected to the ECU 70 via the in-vehicle network, and the output of the vehicle state detection device 82 is transmitted to the ECU 70. The vehicle state detection device 82 includes, for example, a speed sensor, and a yaw rate sensor. The speed sensor detects the speed of the vehicle 1. The yaw rate sensor detects a yaw rate that is a rotational speed about a vertical axis passing through the center of gravity of the vehicle 1.

Also, the vehicle 1 includes a passenger detection device 83. The passenger detection device 83 is used to detect the presence of a passenger in the vehicle 1 and to confirm the getting-on and getting-off of the passenger. The passenger detection device 83 is connected to the ECU 70 via the in-vehicle network, and the output of the passenger detection device 83 is transmitted to the ECU 70. The passenger detection device 83 includes, for example, an in-vehicle camera, a seatbelt sensor, a seating sensor, and an information reader. The in-vehicle camera captures the inside of the vehicle 1 and generates an in-vehicle image. The in-vehicle camera is disposed, for example, on a ceiling of the vehicle 1 so as to capture the passenger in the vehicle 1. The in-vehicle camera may be a plurality of cameras disposed at different positions in the vehicle.

The seatbelt sensor detects whether the passenger wears the seatbelt. The seating sensor detects whether the passenger is seated in the seat. The seatbelt sensor and the seating sensor are provided for each seat. The information reader reads identification information of the portable terminal 3, a QR code (registered trademark) or a password transmitted to the user as vehicle allocation information, card information of a utilization card for using the ride-hailing service, and the like. The information reader is disposed near the door of the vehicle 1, or is provided for each seat.

Also, the vehicle 1 also includes a GPS receiver 84. The GPS receiver 84 receives signals from three or more GPS satellites and detects a current position of the vehicle 1 (for example, the latitude and longitude of the vehicle 1). The GPS receiver 84 is connected to the ECU 70 via the in-vehicle network, and the output of the GPS receiver 84 is transmitted to the ECU 70.

Also, the vehicle 1 includes a map database 85. The map database 85 includes map information. The map database 85 is connected to the ECU 70 via the in-vehicle network, and the ECU 70 acquires the map information from the map database 85. The map information stored in the map database 85 is updated using data received from the outside of the vehicle 1, or simultaneous localization and mapping (SLAM) technology.

Also, the vehicle 1 includes an actuator 86. The actuator 86 operates the vehicle 1. The actuator 86 is connected to the ECU 70 via the in-vehicle network, and the ECU 70 controls the actuator 86. The actuator 86 includes, for example, a drive device (at least one of an engine and a motor) for accelerating the vehicle 1, a brake actuator for braking the vehicle 1, and a steering motor for steering the vehicle 1.

Also, the vehicle 1 includes a human machine interface (HMI) 87. The HMI 87 is an interface for inputting and outputting information between the passenger and the vehicle 1. The HMI 87 includes, for example, a display for displaying information, a speaker for generating sound, an operation button or touch screen for the passenger to perform an input operation, and a microphone for receiving a voice of the passenger. The HMI 87 is connected to the ECU 70 via the in-vehicle network, the output of the ECU 70 is transmitted to the passenger via the HMI 87, and input information from the passenger is input to the ECU 70 via the HMI 87.

Also, the vehicle 1 includes a communication module 88. The communication module 88 is a device that enables communication between the vehicle 1 and the outside of the vehicle 1. The communication module 88 includes, for example, a data communication module (DCM) and a short-range wireless communication module (for example, a Wi-Fi module or a Bluetooth (registered trademark) module). The data communication module communicates with the server 2 via a wireless base station 6 and a communication network 5. The short-range wireless communication module directly communicates with the portable terminal 3.

The server 2 is provided outside the vehicle 1 and manages the user and the vehicle 1 in order to efficiently provide the mobility service. Specifically, the server 2 performs registration of user information, matching between the user and the vehicle 1, creation of the traveling plan, settlement of the usage charge, and the like. The server 2 is managed by the service provider who provides the mobility service.

As shown in FIG. 1, the server 2 includes a communication interface 21, a storage device 22, a memory 23, and a processor 24. The communication interface 21, the storage device 22, and the memory 23 are connected to the processor 24 via signal lines. The server 2 may further include the input device such as a keyboard and a mouse, and an output device such as a display. Also, the server 2 may be configured by a plurality of computers.

The communication interface 21 has an interface circuit for connecting the server 2 to the communication network 5. The server 2 communicates with the vehicle 1 and the portable terminal 3 via the communication interface 21.

The storage device 22 includes, for example, a hard disk drive (HDD), a solid state drive (SSD), or an optical recording medium. The storage device 22 stores various data, and stores, for example, the user information, vehicle information, the map information, or a computer program for the processor 24 to execute various processes. The computer program may be recorded in the recording medium such as the optical recording medium or a magnetic recording medium, and distributed.

The memory 23 includes, for example, the semiconductor memory such as a random access memory (RAM). The memory 23 stores, for example, various data used when the processor 24 executes various processes.

The processor 24 has one or a plurality of CPUs and peripheral circuits of CPUs, and executes various processes. The processor 24 may further include an arithmetic circuit such as a logical operation unit or a numerical operation unit.

The portable terminal 3 is owned by the user and is movable with the user. The portable terminal 3 is a device that can communicate with the server 2 via the wireless base station 6 and the communication network 5. The portable terminal 3 includes the input device such as a touch panel and the microphone, and the output device such as the display and the speaker. The portable terminal 3 is, for example, a smartphone, a tablet terminal, a personal computer.

Figure 3:
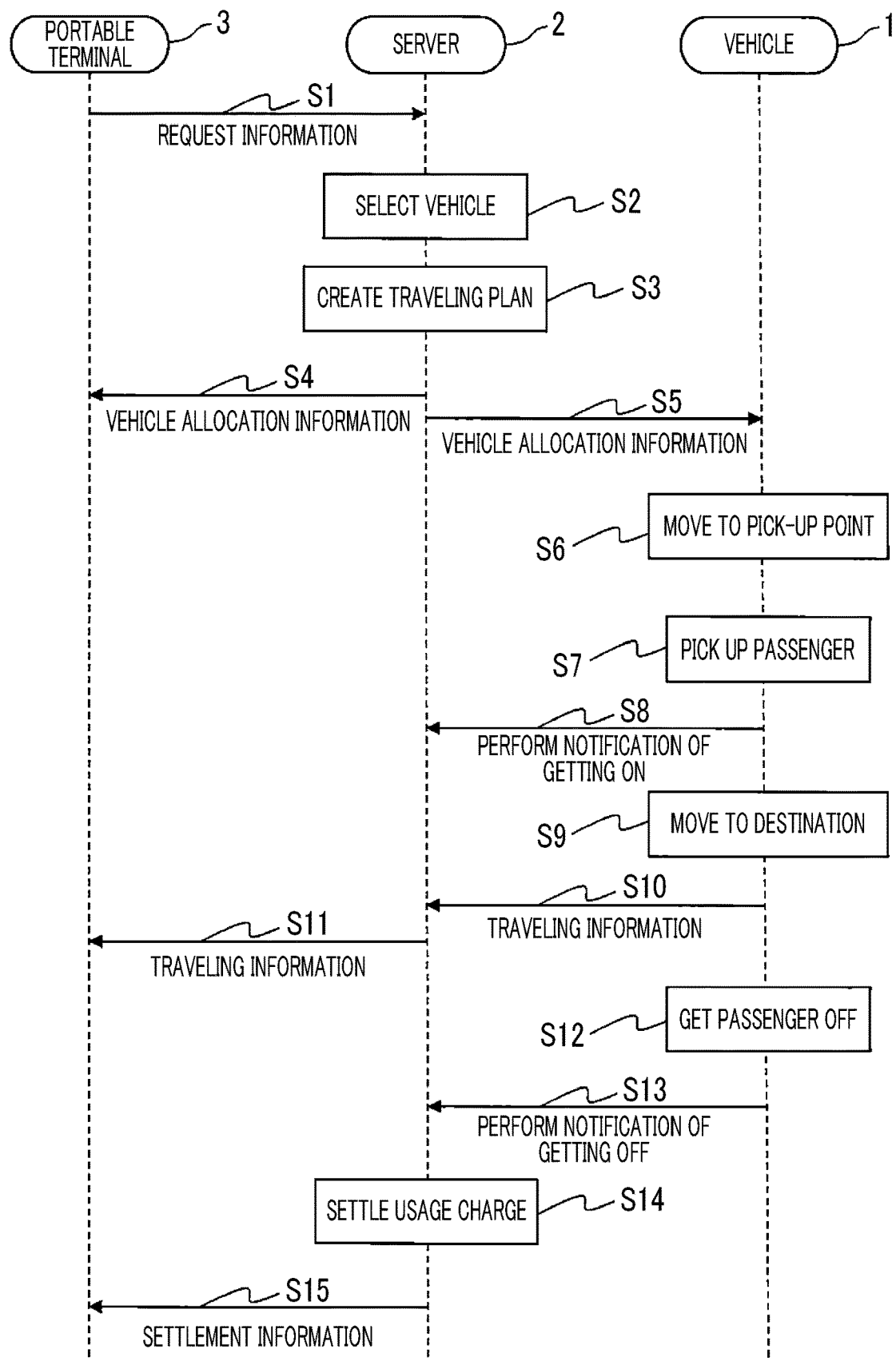
FIG. 3 is a sequence diagram showing an example of an operation of the passenger transportation system.

Hereinafter, the flow of the mobility service will be briefly described with reference to FIG. 3. FIG. 3 is a sequence diagram showing an example of an operation of the passenger transportation system 10. In the sequence diagram, communication between the server 2 and the portable terminal 3 and communication between the server 2 and the vehicle 1 are performed via the communication network 5.

A user who uses the mobility service registers the user information in advance using the portable terminal 3 or the like. The registered user information is stored in the storage device 22 of the server 2 for each user. When the user requests the use of the mobility service, that is, when the user requests arrangement of the vehicle 1, the user operates the portable terminal 3 to input request information to the portable terminal 3. The user inputs the request information, for example, on an application for mobility service installed in the portable terminal 3.

When the request information is input to the portable terminal 3, the portable terminal 3 transmits the request information to the server 2 (step S1). The request information includes a pick-up point, the destination, identification information of the user (for example, a registration number of the user), fellow passenger information (for example, the number of passengers), and permission of vehicle sharing with others. The pick-up point refers to the desired getting-on position of the user.

When the server 2 receives the request information from the user via the portable terminal 3, the server 2 selects the vehicle 1 suitable for transportation of the user (step S2). That is, the server 2 performs matching between the user and the vehicle 1. The vehicle 1 suitable for transportation of the user is, for example, the waiting vehicle 1 closest to the pick-up point. In addition, when the user permits vehicle sharing with others, the vehicle 1 that another user currently uses may be selected.

Further, the server 2 creates the traveling plan for transportation of the user (step S3). The traveling plan includes estimated arrival time to the pick-up point, a travel route to the destination, estimated arrival time to the destination, and the like.

Next, the server 2 transmits the vehicle allocation information to the portable terminal 3 (step S4). The vehicle allocation information transmitted to the portable terminal 3 includes the estimated arrival time to the pick-up point, a travel route to the destination, the estimated arrival time to the destination, identification information of the vehicle 1 (the numbers of vehicle license plate, a model of vehicle, or a color), and the presence or absence of others sharing the vehicle. Further, the server 2 transmits the vehicle allocation information to the vehicle 1 (step S5). The vehicle allocation information transmitted to the vehicle 1 includes the pick-up point, the destination, the travel route to the destination, the identification information of the user, and the like.

When the vehicle 1 receives the vehicle allocation information from the server 2, the vehicle 1 starts moving to the pick-up point (step S6). Thereafter, when the vehicle 1 reaches the pick-up point, the vehicle 1 picks up the passenger (a user, or the user and a fellow passenger) (step S7).

When the passenger gets on the vehicle 1, the vehicle 1 notifies the server 2 that the passenger gets on the vehicle. Specifically, the vehicle 1 transmits a getting-on notification to the server 2 (step S8). When the passenger gets on the vehicle, the vehicle 1 starts moving to the destination (step S9).

The vehicle 1 transmits traveling information to the server 2 at predetermined intervals while the vehicle moves to the destination (step S10). The traveling information transmitted to the server 2 includes the current position of the vehicle 1, the periphery information of the vehicle 1, and the like. Further, the server 2 transmits the traveling information to the portable terminal 3 at predetermined intervals while the vehicle moves to the destination (step S11). The traveling information transmitted to the portable terminal 3 includes the current position of the vehicle 1, the estimated arrival time to the destination, congestion information of the travel route, and the like.

Thereafter, when the vehicle 1 reaches the destination, the passenger gets off the vehicle 1 (step S12). When the passenger gets off the vehicle 1, the vehicle 1 notifies the server 2 that the passenger gets off the vehicle. Specifically, the vehicle 1 transmits a getting-off notification to the server 2 (step S13).

Further, the server 2 settles the usage charge of the mobility service after the passenger gets off (step S14). For example, the server 2 settles the usage charge by account transfer or credit card settlement based on the user information stored in the storage device 22 of the server 2. The vehicle 1 transmits the settlement information including the contents of the settlement to the portable terminal 3 after the settlement of the usage charge is performed (step S15).

As described above, the user designates the destination before the user gets on the vehicle, the passenger gets off the vehicle 1 when the vehicle 1 reaches the destination. At this time, as in the taxi of the related art, the designation of the detailed getting-off position is desirable to be made by the passenger in the vehicle in the vicinity of the destination. However, when all places in the vicinity of the destination can be designated as the getting-off position, the passenger has difficulty in the designation of an appropriate place as the getting-off position. For example, in a case where the passenger is not well-informed about the traffic condition in the vicinity of the destination, the passenger has difficulty in quick recognition of a place that the passenger can get off. In the present embodiment, a region where stopping is prohibited is presented to the passenger as an index for the passenger to designate the detailed getting-off position.

Figure 4:
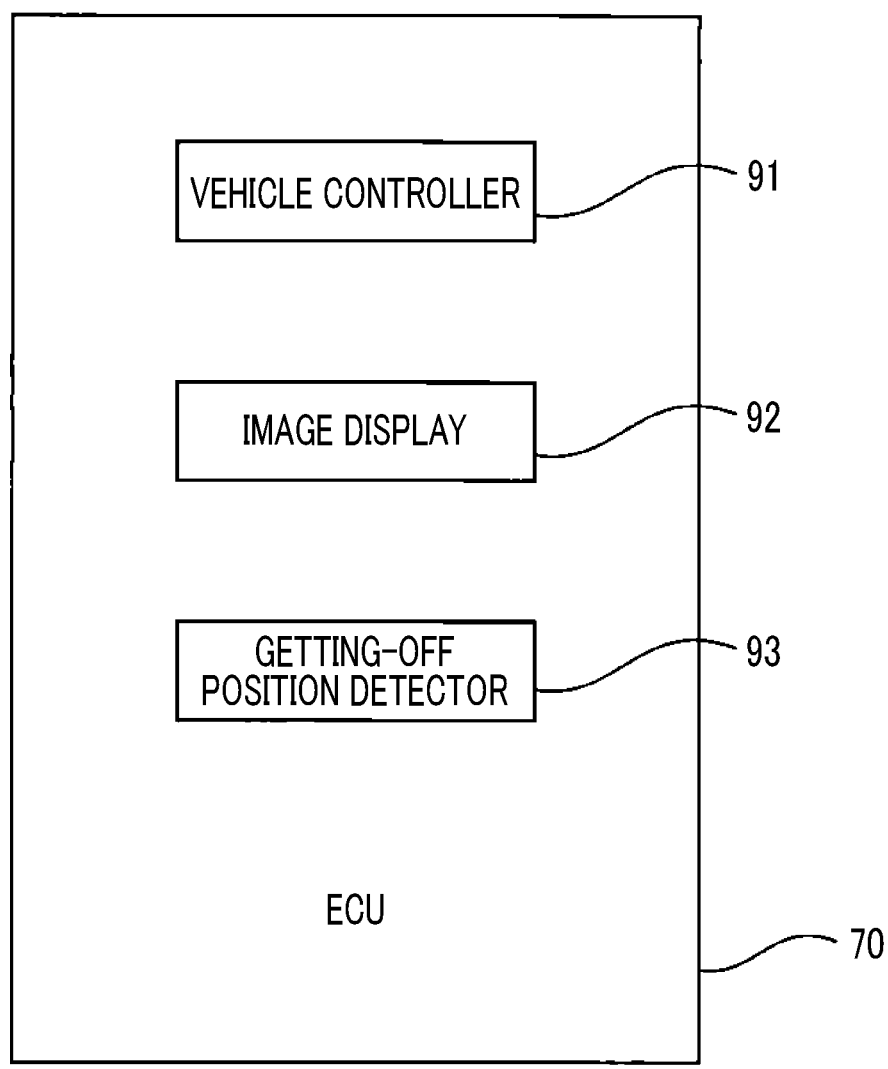
FIG. 4 is a functional block diagram of an electronic control unit (ECU) of the vehicle.

FIG. 4 is a functional block diagram of the ECU 70 of the vehicle 1. In the present embodiment, the ECU 70 includes a vehicle controller 91, an image display 92, and a getting-off position detector 93. The vehicle controller 91, the image display 92, and the getting-off position detector 93 are functional blocks realized by the processor 73 of the ECU 70 executing the programs stored in the memory 72 of the ECU 70.

The vehicle controller 91 controls operation of the vehicle 1 by using the actuator 86. The image display 92 displays the image of a periphery of the destination to the passenger of the vehicle 1 via the output device when the vehicle 1 travels in the vicinity of the destination. At this time, a region where stopping is prohibited (hereinafter, referred to as a "prohibited region") is shown in the image of a periphery of the destination. As a result, the passenger can easily recognize a place that the passenger is able to get off, the designation of the getting-off position by the passenger is facilitated.

The getting-off position detector 93 detects the desired getting-off position designated by the passenger of the vehicle 1 via the input device. When the passenger gets off, the vehicle controller 91 causes the vehicle 1 to move to the desired getting-off position detected by the getting-off position detector 93, and causes the vehicle 1 to stop at the desired getting-off position.

Getting-Off Process

Figure 5:
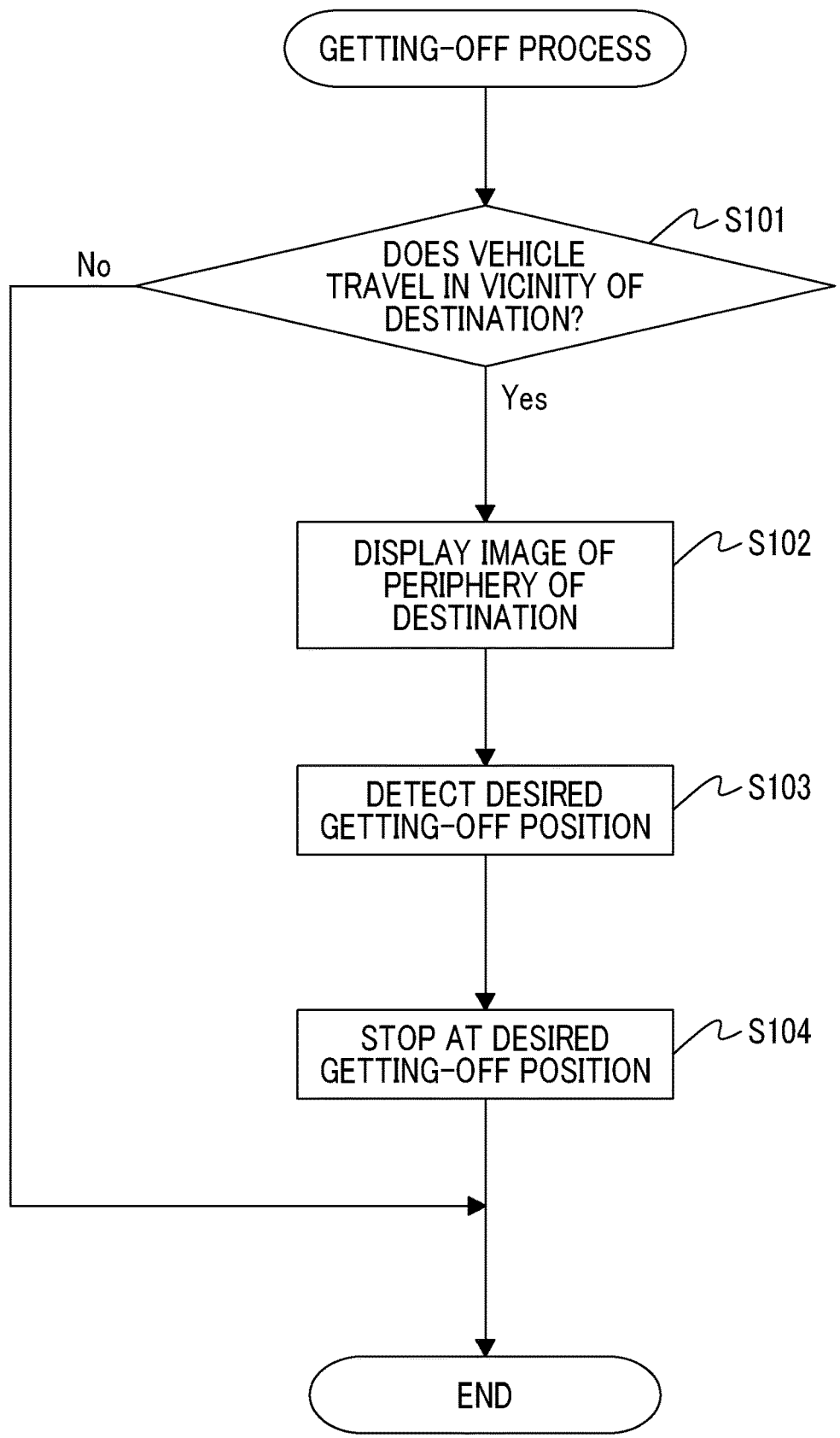
FIG. 5 is a flowchart showing a control routine of a getting-off process in the first embodiment.

Hereinafter, control when the passenger gets off the vehicle will be described in detail with reference to FIG. 5. FIG. 5 is a flowchart showing a control routine of a getting-off process in the first embodiment. The control routine is repeatedly executed by the ECU 70.

First, in step S101, the image display 92 determines whether the vehicle 1 travels in the vicinity of the destination. For example, the image display 92 determines that the vehicle 1 travels in the vicinity of the destination in a case where a distance from the vehicle 1 to the destination is equal to or less than a predetermined distance. The distance from the vehicle 1 to the destination is a linear distance or a distance of the travel route. The distance from the vehicle 1 to the destination is calculated based on, for example, a position of the destination included in the vehicle allocation information transmitted to the vehicle 1, the current position of the vehicle 1 detected by the GPS receiver 84, and the map information of the map database.

The image display 92 determines that the vehicle 1 travels in the vicinity of the destination in a case where the time needed for the vehicle 1 to reach the destination is equal to or less than a predetermined time. In this case, the needed time is calculated based on, for example, the position of the destination included in the vehicle allocation information transmitted to the vehicle 1, the current position of the vehicle 1 detected by the GPS receiver 84, the map information of the map database, and vehicle speed detected by the vehicle state detection device 82.

In a case where the image display 92 determines that the vehicle 1 does not travel in the vicinity of the destination in step S101, the control routine is ended. On the other hand, in a case where the image display 92 determines that the vehicle 1 travels in the vicinity of the destination in step S101, the control routine proceeds to step S102.

In step S102, the image display 92 displays the image of a periphery of the destination to the passenger via the output device. The image of a periphery of the destination is, for example, a peripheral map image of the destination (hereinafter, simply referred to as a "map image"). The map image is included in the map database 85.

The output device displaying the image of a periphery of the destination is at least one of the HMI 87 and the portable terminal 3. In a case where the output device includes the HMI 87, the image display 92 transmits the image of a periphery of the destination to the HMI 87 via the in-vehicle network, and displays the image of a periphery of the destination on the HMI 87. On the other hand, in a case where the output device includes the portable terminal 3, the image display 92 transmits the image of a periphery of the destination to the portable terminal 3 via the communication network 5 and the server 2 or directly transmits the image of a periphery of the destination to the portable terminal 3 by the wireless communication, and displays the image of a periphery of the destination on the portable terminal 3.

The map image may be stored in the server 2 (specifically, the storage device 22). In this case, the map image is displayed on the output device, for example, as follows. In a case where the output device includes the HMI 87, the image display 92 receives the map image stored in the server 2 via the communication network 5, transmits the map image to the HMI 87 via the in-vehicle network, and displays the map image on the HMI 87. Further, in a case where the output device includes the HMI 87, the server 2 may have the image display 92, and the image display 92 may transmit the map image stored in the server 2 to the HMI 87 via the communication network 5 and display the map image on the HMI 87. On the other hand, the output device includes the portable terminal 3, the server 2 has the image display 92, and the image display 92 transmits the map image stored in the server 2 to the portable terminal 3 via the communication network 5 and displays the map image on the portable terminal 3.

Figure 6:
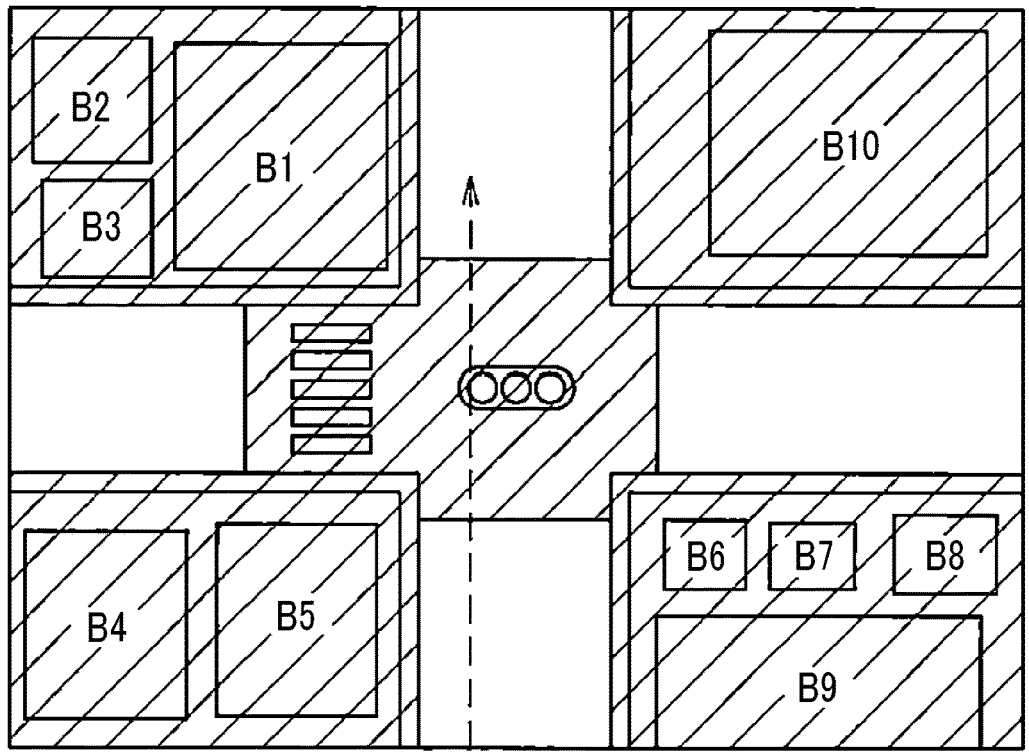
FIG. 6 is an example of an image of a periphery of a destination.

FIG. 6 is an example of the image of a periphery of the destination. In the example of FIG. 6, the image of a periphery of the destination is the two-dimensional map image. The image of a periphery of the destination shows the destination (in this example, a building B1) and the travel route to the destination.

Also, the image of a periphery of the destination shows the prohibited region. In the example of FIG. 6, the prohibited region is shown by hatching. The prohibited region includes a region where stopping is prohibited by traffic regulations. Also, as shown in FIG. 6, the prohibited region includes a region other than the roadway. A display mode of the prohibited region is not limited to hatching as long as stopping prohibition is indicated to the passenger. For example, the prohibited region may be grayed out. Also, the brightness of the prohibited region may be lowered.

Also, the image display 92 may determine the prohibited region based on the periphery information of the vehicle 1 detected by the periphery information detection device 81. As a result, the prohibited region that is not determined based on the map information can be specified, and designation of the desired getting-off position by a passenger can be more facilitated. For example, in a case where periphery information detection device 81 detects a vehicle occupying a region where stopping is permitted by traffic regulations, the image display 92 sets the region as the prohibited region.

Figure 7:
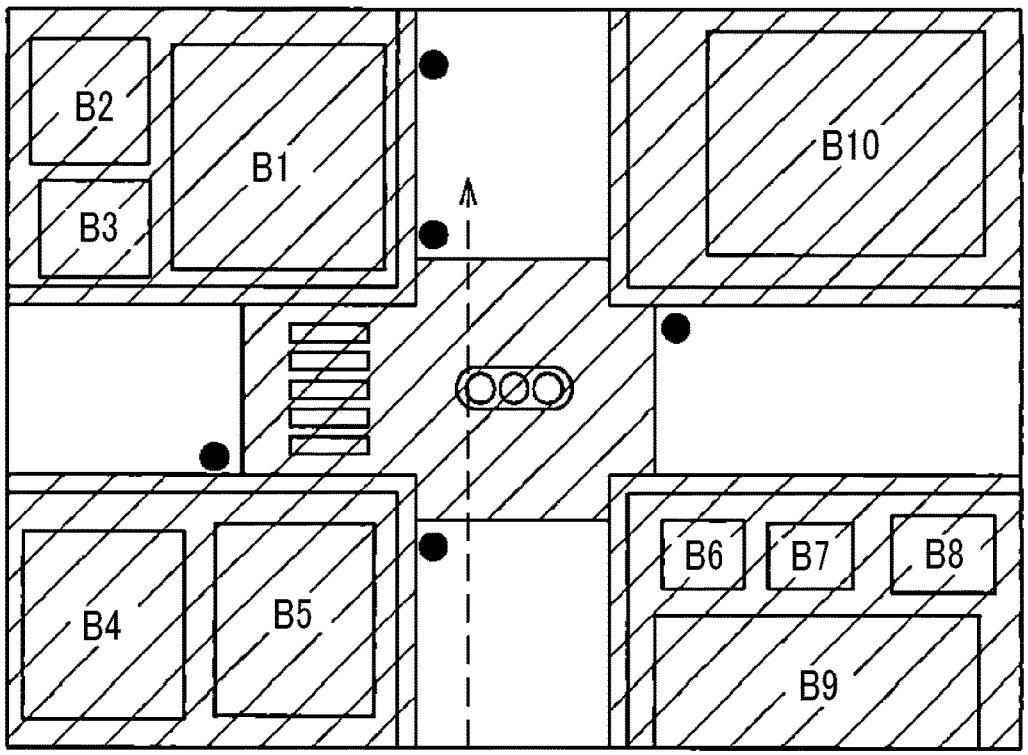
FIG. 7 is another example of the image of a periphery of the destination.
Figure 8:
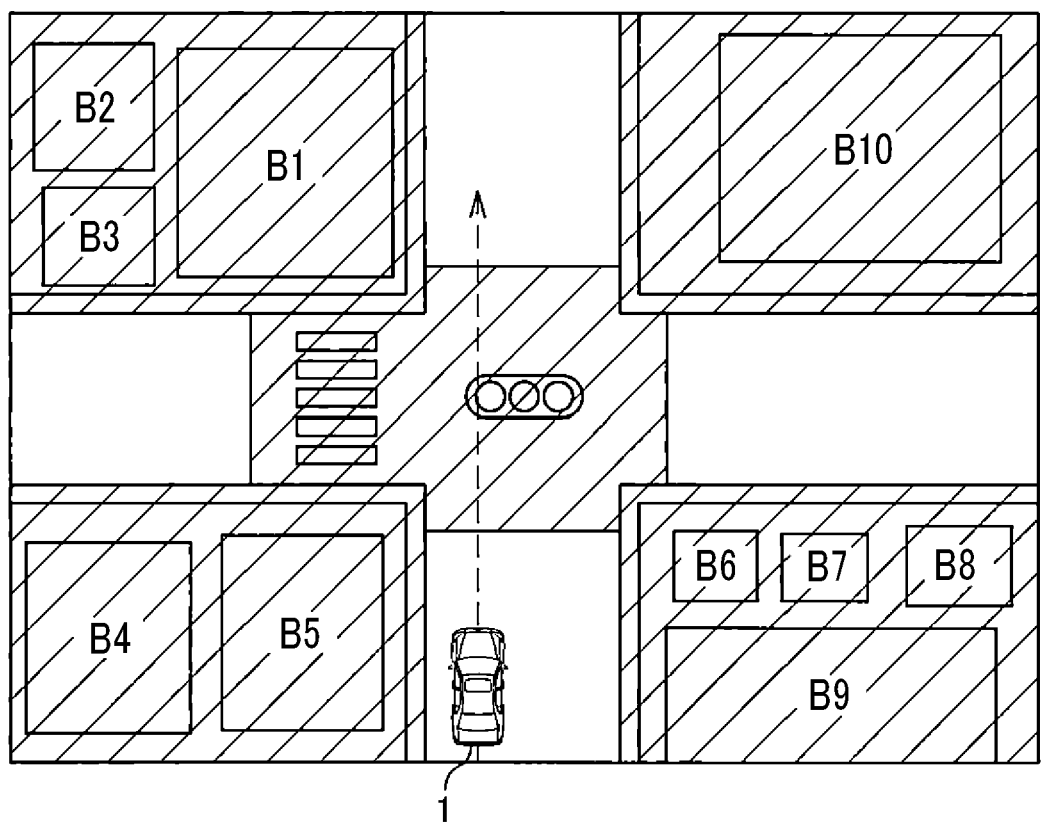
FIG. 8 is another example of the image of a periphery of the destination.

FIGS. 7 and 8 are other examples of the image of a periphery of the destination. As shown in FIG. 7, the image of a periphery of the destination may show a candidate for the getting-off position. In the example of FIG. 7, the candidate for the getting-off position is indicated by black circles. The candidate for the getting-off position is set to the region other than the prohibited region. The candidate for the getting-off position may be one or more. In a case where the candidate for the getting-off position is shown, the passenger can use the candidate for the getting-off position as the index for designating the getting-off position. Therefore, the designation of the desired getting-off position by the passenger is facilitated.

Also, as shown in FIG. 8, the image of a periphery of the destination may show the current position of the vehicle 1. As a result, a positional relationship between the destination and the vehicle 1 becomes clear, and the designation of the desired getting-off position by the passenger is more facilitated. Also, the image of a periphery of the destination may show the candidate of the getting-off position and the current position of the vehicle 1.

Also, the image of a periphery of the destination may be a three-dimensional image. For example, the image of a periphery of the destination may be a three-dimensional map image, or an image of the outside of the vehicle generated by the periphery information detection device 81 (specifically, the external camera).

Next, in step S103, the getting-off position detector 93 detects the desired getting-off position designated by the passenger via the input device. When the passenger designates the desired getting-off position, the passenger inputs the desired getting-off position to the input device by, for example, operating the touch screen or inputting the voice. The getting-off position detector 93 detects the desired getting-off position based on the input to the input device by the passenger.

The input device to which the desired getting-off position is input includes at least one of the HMI 87 and the portable terminal 3 and is identical with the output device displaying the image of a periphery of the destination. In this case, the output device displaying the image of a periphery of the destination, and the input device to which the desired getting-off position is input are configured as an input and output device. The output device displaying the image of a periphery of the destination and the input device to which the desired getting-off position is input may be different from each other. For example, the output device displaying the image of a periphery of the destination may be the HMI 87 and the input device to which the desired getting-off position is input may be the portable terminal 3.

In a case where the input device includes the HMI 87, the getting-off position detector 93 receives an input signal to the HMI 87 via the in-vehicle network, and detects the desired getting-off position based on the input signal. In a case where the input device includes the HMI 87, the server 2 may have the getting-off position detector 93, and the getting-off position detector 93 may receive the input signal to the HMI 87 via the communication network 5 and detect the desired getting-off position based on the input signal.

On the other hand, in a case where the input device includes the portable terminal 3, the getting-off position detector 93 receives the input signal to the portable terminal 3 via the communication network 5 and the server 2 or directly receives the input signal from the portable terminal 3 by the wireless communication, and detects the desired getting-off position based on the input signal. In a case where the input device includes the portable terminal 3, the server 2 may have the getting-off position detector 93, and the getting-off position detector 93 may receive the input signal to the portable terminal 3 via the communication network 5 and detect the desired getting-off position based on the input signal.

Next, in step S104, the vehicle controller 91 causes the vehicle 1 to move to the desired getting-off position detected by the getting-off position detector 93 and to stop the vehicle 1 at the desired getting-off position. After step S104, the control routine is ended.

Second Embodiment

Configurations and controls of the vehicle control device according to the second embodiment are basically the same as the vehicle control device of the first embodiment except for the points described below. Therefore, in the following, the second embodiment of the present disclosure will be described focusing on differences from the first embodiment.

As described above, when the passenger designates the desired getting-off position, the image of a periphery of the destination is presented to the passenger. However, the passenger may want to designate the desired getting-off position by actually confirming the situation around the destination. Also, the image presented to the passenger may not include the desired getting-off position of the passenger.

In the second embodiment, when the vehicle 1 travels in the vicinity of the destination, the vehicle controller 91 causes the vehicle 1 to move in a direction designated by the passenger via the input device, before the getting-off position detector 93 detects the desired getting-off position. As a result, the passenger can actually confirm the situation around the destination, and can designate an optimal getting-off position as the desired getting-off position.

Getting-Off Process

Figure 9:
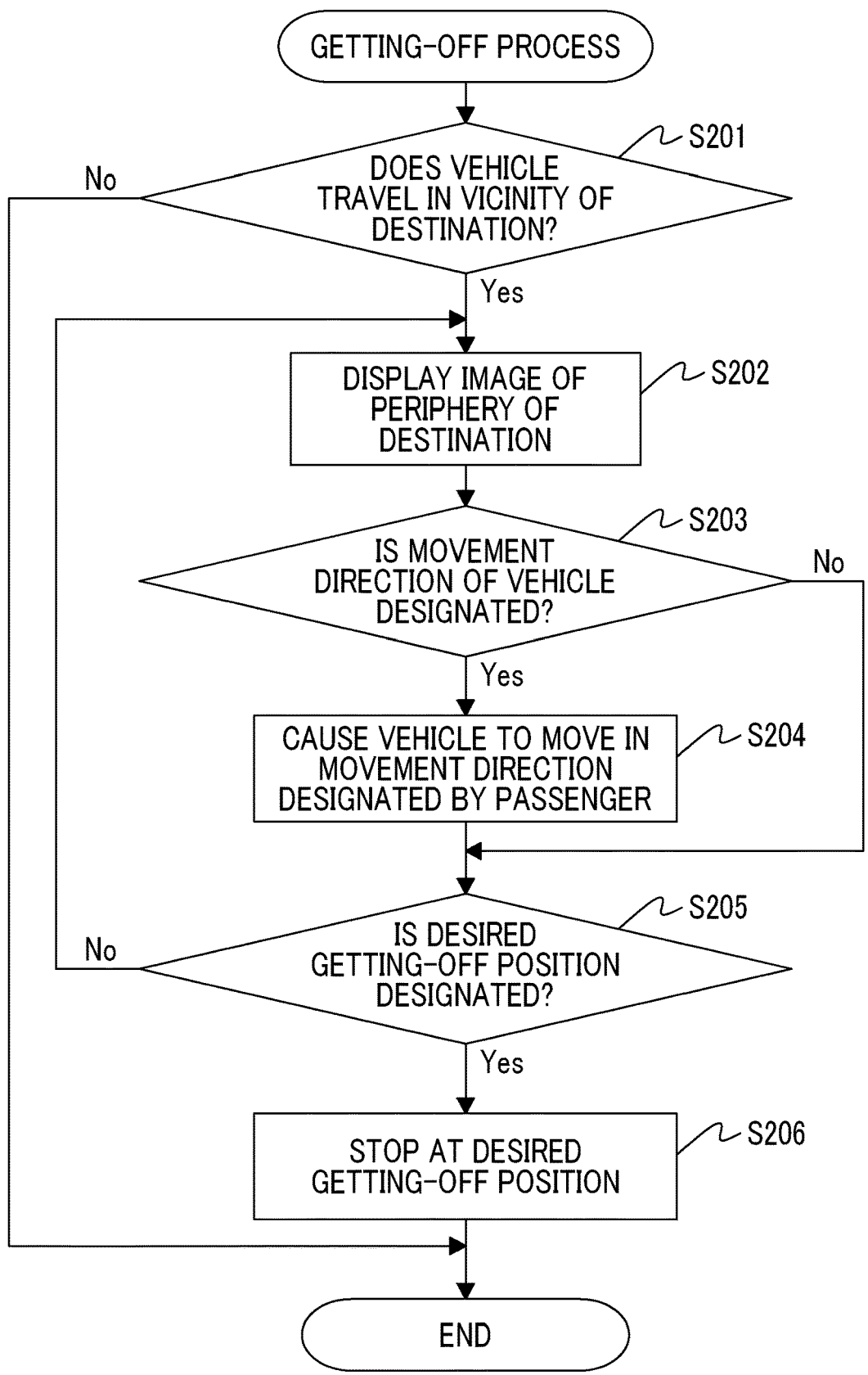
FIG. 9 is a flowchart showing a control routine of a getting-off process in a second embodiment.

FIG. 9 is a flowchart showing a control routine of a getting-off process in a second embodiment. The control routine is repeatedly executed by the ECU 70. Since step S201 and step S202 are the same as step S101 and step S102 in FIG. 5, the description of step S201 and step S202 is omitted.

In the control routine, after step S202, the vehicle controller 91 determines whether the movement direction of the vehicle 1 is designated by the passenger, in step S203. When the passenger designates the movement direction of the vehicle 1, the passenger inputs the movement direction of the vehicle 1 to the input device by, for example, operating the touch screen (for example, arrow pointer shown in an intersection image on the touch screen) or inputting the voice. The vehicle controller 91 detects the movement direction of the vehicle 1 based on the input of the passenger to the input device. The vehicle controller 91 determines that the movement direction of the vehicle 1 is designated by the passenger in a case where the movement direction of the vehicle 1 is detected.

The input device to which the movement direction of the vehicle 1 is input includes at least one of the HMI 87 and the portable terminal 3, and is same as the input device to which the desired getting-off position is input. In a case where the input device includes the HMI 87, the vehicle controller 91 receives the input signal to the HMI 87 via the in-vehicle network, and detects the movement direction of the vehicle 1 based on the input signal. On the other hand, in a case where the input device includes the portable terminal 3, the vehicle controller 91 receives the input signal to the portable terminal 3 via the communication network 5 and the server 2 or directly receives the input signal from the portable terminal 3 by the wireless communication, and detects the movement direction of the vehicle 1 based on the input signal.

In a case where the vehicle controller 91 determines that the movement direction of the vehicle 1 is designated by the passenger in step S203, the control routine proceeds to step S204. In step S204, the vehicle controller 91 causes the vehicle 1 to move in the movement direction designated by the passenger. After step S204, the control routine proceeds to step S205. On the other hand, in a case where the vehicle controller 91 determines that the movement direction of the vehicle 1 is not designated by the passenger in step S203, the control routine skips step S204 and proceeds to step S205.

In step S205, the getting-off position detector 93 determines whether the desired getting-off position is designated by the passenger. The getting-off position detector 93 detects the desired getting-off position as in step S103 of FIG. 5, and determines that the desired getting-off position is designated by the passenger in a case where the desired getting-off position is detected.

In a case where the getting-off position detector 93 determines that the desired getting-off position is not designated by the passenger, in step S205, the control routine returns to step S202. On the other hand, in a case where the getting-off position detector 93 determines that the desired getting-off position is designated by the passenger, in step S205, the control routine proceeds to step S206.

In step S206, the vehicle controller 91 causes the vehicle 1 to move to the desired getting-off position detected by the getting-off position detector 93, and causes the vehicle 1 to stop at the desired getting-off position. After step S206, the control routine is ended.

Third Embodiment

Configurations and controls of the vehicle control device according to the third embodiment are basically the same as the vehicle control device of the first embodiment except for the points described below. Therefore, in the following, the third embodiment of the present disclosure will be described focusing on differences from the first embodiment.

As described above, the vehicle 1 stops at the desired getting-off position designated by the passenger for the passenger to get off the vehicle 1. However, in a case where the passenger does not want to designate the detailed getting-off position, or in a case where the passenger is sleeping, the desired getting-off position may not be designated by the passenger.

In the third embodiment, in a case where the getting-off position detector 93 does not detect the desired getting-off position, the vehicle controller 91 causes the vehicle 1 to stop at a position where a distance to the destination is equal to or less than a predetermined value and stopping is not prohibited. Accordingly, getting-off of the passenger at an appropriate position can be completed without the operation of the passenger.

Getting-Off Process

Figure 10:
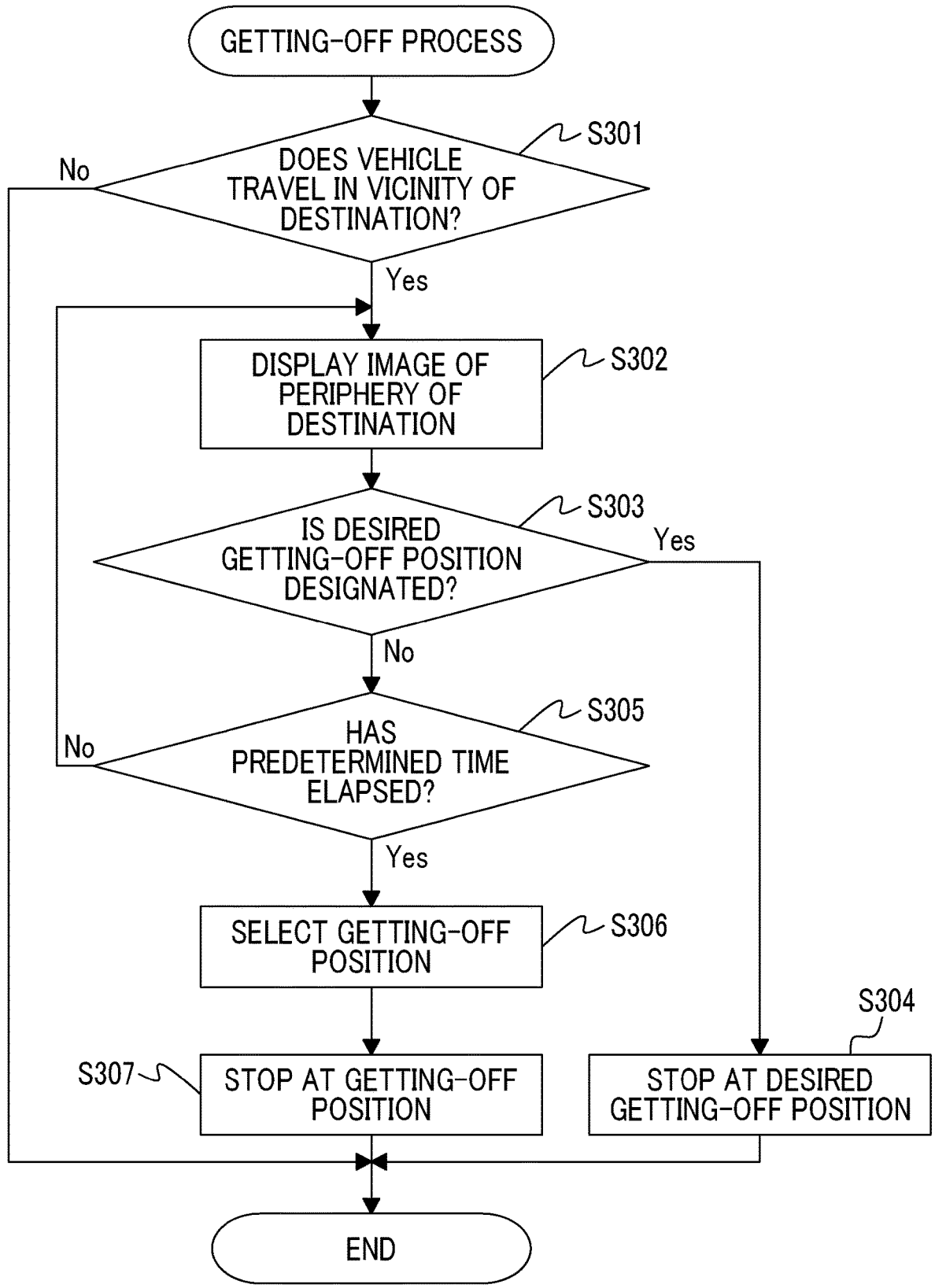
FIG. 10 is a flowchart showing a control routine of a getting-off process in a third embodiment.

FIG. 10 is a flowchart showing a control routine of a getting-off process in a third embodiment. The control routine is repeatedly executed by the ECU 70. Since step S301 and step S302 are the same as step S101 and step S102 in FIG. 5, the description of step S301 and step S302 is omitted.

In the control routine, after step S302, the getting-off position detector 93 determines whether the desired getting-off position is designated by the passenger, in step S303. The getting-off position detector 93 detects the desired getting-off position as in step S103 of FIG. 5, and determines that the desired getting-off position is designated by the passenger in a case where the desired getting-off position is detected.

In a case where the getting-off position detector 93 determines that the desired getting-off position is designated by the passenger in step S303, the control routine proceeds to step S304. In step S304, the vehicle controller 91 causes the vehicle 1 to move to the desired getting-off position detected by the getting-off position detector 93, and causes the vehicle 1 to stop at the desired getting-off position. After step S304, the control routine is ended.

On the other hand, in a case where the getting-off position detector 93 determines that the desired getting-off position is not designated by the passenger in step S303, the control routine proceeds to step S305. In step S305, the vehicle controller 91 determines whether a predetermined time has elapsed since the image of a periphery of the destination has been displayed to the passenger. In a case where the vehicle controller 91 determines that the predetermined time has not elapsed, the control routine returns to step S302. On the other hand, in a case where the vehicle controller 91 determines that the predetermined time has elapsed, the control routine proceeds to step S306.

In step S306, the vehicle controller 91 selects a position where a distance to the destination is equal to or less than a predetermined value and stopping is not prohibited, as the getting-off position. Next, in step S307, the vehicle controller 91 causes the vehicle 1 to move to the getting-off position selected in step S306, and causes the vehicle 1 to stop at the getting-off position. After step S307, the control routine is ended.

Fourth Embodiment

Configurations and controls of the vehicle control device according to the fourth embodiment are basically the same as the vehicle control device of the first embodiment except for the points described below. Therefore, in the following, the fourth embodiment of the present disclosure will be described focusing on differences from the first embodiment.

As described above, the prohibited region is shown in the image of a periphery of the destination displayed to the passenger in order to facilitate the designation of the desired getting-off position by the passenger. However, in a case where the optimal getting-off position for the passenger is within the prohibited region, the passenger may designate a position within the prohibited region as the desired getting-off position.

In the fourth embodiment, in a case where the desired getting-off position detected by the getting-off position detector 93 is within the prohibited region, the vehicle controller 91 causes the vehicle 1 to stop at a position where a distance to the desired getting-off position is within a predetermined value and stopping is not prohibited. Accordingly, getting-off of the passenger at an appropriate position in consideration of the demand of the passenger can be completed.

Getting-Off Process

Figure 11:
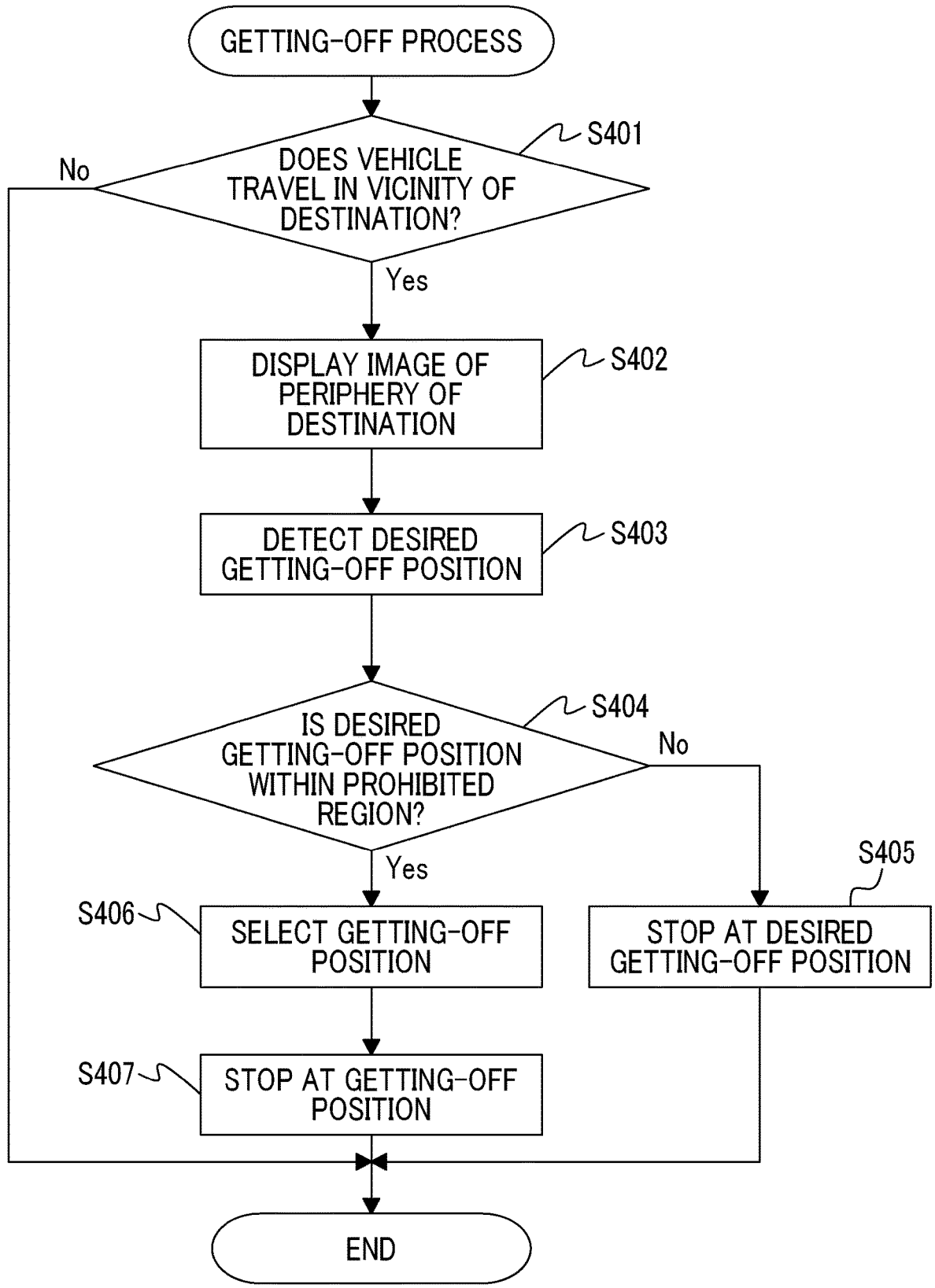
FIG. 11 is a flowchart showing a control routine of a getting-off process in a fourth embodiment.

FIG. 11 is a flowchart showing a control routine of a getting-off process in a fourth embodiment. The control routine is repeatedly executed by the ECU 70. Since step S401 to step S403 are the same as step S101 to step S103 in FIG. 5, the description of step S401 to step S403 is omitted.

In the control routine, after step S403, the vehicle controller 91 determines whether the desired getting-off position detected by the getting-off position detector 93 is a position within the prohibited region in step S404. In a case where the vehicle controller 91 determines that the desired getting-off position is not a position within the prohibited region, the control routine proceeds to step S405. In step S405, the vehicle controller 91 causes the vehicle 1 to move to the desired getting-off position detected by the getting-off position detector 93, and causes the vehicle 1 to stop at the desired getting-off position. After step S405, the control routine is ended.

On the other hand, the vehicle controller 91 determines that the desired getting-off position is a position within the prohibited region in step S404, the control routine proceeds to step S406. In step S406, the vehicle controller 91 selects a position where a distance to the desired getting-off position detected by the getting-off position detector 93 is equal to or less than a predetermined value and stopping is not prohibited, as the getting-off position. Next, in step S407, the vehicle controller 91 causes the vehicle 1 to move to the getting-off position selected in step S406, and causes the vehicle 1 to stop at the getting-off position. After step S407, the control routine is ended.

In order to prevent the desired getting-off position from being set to a position within the prohibited region, the input device to which the desired getting-off position is input may be configured such that the passenger cannot designate a position within the prohibited region as the desired getting-off position. In this case, the control routine of FIG. 5 is executed as the getting-off process. Also, in a case where the input device to which the desired getting-off position is input is configured as the input and output device, the input device may issue a warning to the passenger when the passenger designates a position within the prohibited region as the desired getting-off position. In this case, the input device issues a warning to the passenger by, for example, sound, characters, and light.

Fifth Embodiment

Configurations and controls of the vehicle control device according to the fifth embodiment are basically the same as the vehicle control device of the first embodiment except for the points described below. Therefore, in the following, the fifth embodiment of the present disclosure will be described focusing on differences from the first embodiment.

As described above, the prohibited region is shown in the image of a periphery of the destination displayed to the passenger in order to facilitate the designation of the desired getting-off position by the passenger. However, in a case where a region other than the prohibited region is wide, the passenger has difficulty in a quick designation of the desired getting-off position.

In the fifth embodiment, the image display 92 changes the display mode of a region other than the prohibited region, based on predetermined evaluation criteria. Accordingly, when the passenger designates the desired getting-off position, the passenger can use the display mode of a region other than the prohibited region as an index in addition to the display of the prohibited region. As a result, the designation of the getting-off position by the passenger is more facilitated.

The display mode is, for example, brightness, transparency, a kind of colors, or an interval of hatching. In a case where the display mode is the brightness, for example, the image display 92 makes the brightness of a region where evaluation based on the evaluation criteria is relatively high, than the brightness of a region where evaluation based on the evaluation criteria is relatively low.

In a case where the display mode is the transparency, for example, the image display 92 makes the transparency of a region where evaluation based on the evaluation criteria is relatively high, than the transparency of a region where evaluation based on the evaluation criteria is relatively low. In a case where the display mode is the kind of colors, for example, the image display 92 sets the kind of colors of a region where evaluation based on the evaluation criteria is relatively high, to blue, and sets the kind of colors of a region where evaluation based on the evaluation criteria is relatively low, to red. In a case where the display mode is the interval of hatching, for example, the image display 92 makes the interval of hatching of a region where evaluation based on the evaluation criteria is relatively high, wider than the interval of hatching of a region where evaluation based on the evaluation criteria is relatively low.

The predetermined evaluation criteria are, for example, the degree of safety of the passenger, the demand of the passenger, or a combination thereof. In a case where the predetermined evaluation criteria include the degree of safety of the passenger, the passenger can be urged to designate a position where the degree of safety of the passenger is relatively high, as the desired getting-off position. As a result, the degree of safety of the passenger can be improved. The degree of safety of the passenger includes, for example, a distance from the intersection, the traffic volume, the width of the sidewalk, the maintenance status of the road, the speed limit of the road, the surrounding brightness, and the presence or absence of obstacles.

In a case where the predetermined evaluation criteria include the demand of the passenger, the passenger can be urged to designate a position where the demand of the passenger is relatively high, as the desired getting-off position. As a result, the satisfaction of the passenger can be improved. The demand of the passenger includes, for example, priority items (a distance to the destination, a degree of safety, or the like), the presence or absence of a roof, and the presence or absence of unloading from the trunk.

Before the image of a periphery of the destination is displayed to the passenger, the image display 92 calculates the evaluation based on the evaluation criteria for each region other than prohibited region, based on the map information, the past traffic data, the periphery information of the vehicle 1, and the like. The image display 92 determines the display mode of each region other than the prohibited region based on the calculated evaluation. The map information is stored in the map database 85 or the server 2. The past traffic data is collected from a large number of vehicles and stored in the server 2. The periphery information of the vehicle 1 is detected by the periphery information detection device 81.

In the fifth embodiment, as the getting-off process, the control routine of any one of FIG. 5, FIG. 9 to FIG. 11 is executed. In step S102 of FIG. 5, step S202 of FIG. 9, step S302 of FIG. 10, or step S403 of FIG. 11, the image display 92 changes the display mode of the region other than the prohibited region based on the predetermined evaluation criteria when the image display 92 displays the image of a periphery of the destination to the passenger.

Although the preferred embodiments according to the present disclosure have been described above, the present disclosure is not limited to these embodiments, and various modifications and changes can be made within the scope of the claims.

For example, the vehicle 1 may be used only by one specific user. In this case, matching between the user and the vehicle 1 is not performed. Also, the vehicle 1 may be owned by the user instead of the service provider providing the mobility service. In this case, matching between the user and the vehicle 1 and settlement of the usage charge are not performed.

Also, a plurality of candidates for the getting-off position and priorities of the candidates may be shown in the image of a periphery of the destination displayed to the passenger. In this case, the image display 92 may raise the priority of the candidate for which evaluation based on predetermined evaluation criteria is relatively high, than the priority of the candidate for which the evaluation based on the predetermined evaluation criteria is relatively low. Accordingly, the passenger can be urged to designate a position where the evaluation based on the evaluation criteria is high, as the desired getting-off position. The evaluation criteria used to determine the priority are the same as the evaluation criteria used to determine the display mode of the prohibited region.

Also, the vehicle controller 91 controls the vehicle speed to be equal to or less than a predetermined speed when the vehicle 1 travels in the vicinity of the destination. The predetermined speed is, for example, 5 km/h to 30 km/h. Also, the vehicle controller 91 causes the vehicle 1 to temporarily stop when the vehicle 1 travels in the vicinity of the destination. By the controls, time for the passenger to designate the desired getting-off position can be secured.

Also, the embodiments described above can be implemented in any combination. In a case where the second embodiment and the third embodiment are combined with each other, step S203 and step S204 of FIG. 9 are executed between step S302 and step S303 in the control routine of the getting-off process of FIG. 10. In a case where the third embodiment and the fourth embodiment are combined with each other, step S404 to step S407 of FIG. 11 are executed instead of step S304 in the control routine of the getting-off process of FIG. 10.

In a case where the second embodiment, the third embodiment, and the fourth embodiment are combined together, in the control routine of the getting-off process of FIG. 10, step S203 and step S204 of FIG. 9 is executed between step S302 and step S303, and step S404 to step S407 of FIG. 11 are executed instead of step S304. In a case where the second embodiment and the fourth embodiment are combined with each other, step S404 to step S407 of FIG. 11 are executed instead of step S206 in the control routine of the getting-off process of FIG. 9.

What is claimed is:

1. A vehicle control device that controls a vehicle configured to transport a passenger to a destination by autonomous traveling, the vehicle control device comprising:
   a vehicle controller configured to control operation of the vehicle;
   an image display configured to display an image of a periphery of the destination to the passenger via an output device, when the vehicle travels in a vicinity of the destination and before the vehicle arrives at the destination; and
   a getting-off position detector configured to detect a desired getting-off position designated by the passenger via an input device, wherein:
   the image shows a region where stopping is prohibited; and the vehicle controller is configured to cause the vehicle to stop at the desired getting-off position.

2. The vehicle control device according to claim 1, further comprising a periphery information detection device configured to detect periphery information of the vehicle,
wherein the image display is configured to determine the region where stopping is prohibited, based on the periphery information detected by the periphery information detection device.

3. The vehicle control device according to claim 1, wherein when the vehicle travels in the vicinity of the destination, the vehicle controller causes the vehicle to move in a direction designated by the passenger via the input device, before the getting-off position detector detects the desired getting-off position.

4. The vehicle control device according to claim 1, wherein in a case where the getting-off position detector does not detect the desired getting-off position, the vehicle controller causes the vehicle to stop at a position where a distance to the destination is equal to or less than a predetermined value and stopping is not prohibited.

5. The vehicle control device according to claim 1, wherein in a case where the desired getting-off position is within the region where stopping is prohibited, the vehicle controller causes the vehicle to stop at a position where a distance to the desired getting-off position is equal to or less than a predetermined value and stopping is not prohibited.

6. The vehicle control device according to claim 1, wherein the image shows a current position of the vehicle.

7. The vehicle control device according to claim 1, wherein the image shows a candidate for the getting-off position.

8. The vehicle control device according to claim 1, wherein the image display is configured to change a display mode of a region other than the region where stopping is prohibited, based on predetermined evaluation criteria.

9. The vehicle control device according to claim 8, wherein the display mode is brightness, transparency, a kind of colors, or an interval of hatching.

10. A vehicle control device that controls a vehicle configured to transport a passenger to a destination by autonomous traveling, the vehicle control device comprising:
a vehicle controller configured to control operation of the vehicle;
an image display configured to display an image of a periphery of the destination to the passenger via an output device; and
a getting-off position detector configured to detect a desired getting-off position designated by the passenger via an input device,
wherein:
the image shows a region where stopping is prohibited; and
the vehicle controller is configured to cause the vehicle to stop at the desired getting-off position, wherein:
the image shows a candidate for the getting-off position;
the image shows a plurality of the candidates for the getting-off position and priorities of the candidates; and
the image display is configured to raise the priority of the candidate for which evaluation based on predetermined evaluation criteria is relatively high, than the priority of the candidate for which the evaluation is relatively low.

11. The vehicle control device according to claim 10, wherein the evaluation criteria include a degree of safety of the passenger.

12. The vehicle control device according to claim 10, wherein the evaluation criteria include a demand of the passenger.

13. A passenger transportation system including a vehicle control device and an output device, wherein the passenger transportation system causes a vehicle to transport a passenger to a destination by autonomous traveling, comprising:
a vehicle controller configured to control operation of the vehicle,
wherein the output device is configured to display an image of a periphery of the destination showing a region where stopping is prohibited, to the passenger, when the vehicle travels in a vicinity of the destination and before the vehicle arrives at the destination, and
the vehicle controller is configured to cause the vehicle to stop at a desired getting-off position designated by the passenger after the passenger is shown the region where stopping is prohibited.

* * * * *